US012225332B2

United States Patent
Jia

(10) Patent No.: US 12,225,332 B2
(45) Date of Patent: Feb. 11, 2025

(54) OPTICAL TRANSPORT NETWORK ROUTE CALCULATION METHOD, ROUTE CALCULATION APPARATUS, AND STORAGE MEDIUM

(71) Applicant: ZTE CORPORATION, Shenzhen (CN)

(72) Inventor: Yinqiu Jia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 163 days.

(21) Appl. No.: 17/998,280

(22) PCT Filed: Aug. 11, 2021

(86) PCT No.: PCT/CN2021/112080
§ 371 (c)(1),
(2) Date: Nov. 9, 2022

(87) PCT Pub. No.: WO2022/042305
PCT Pub. Date: Mar. 3, 2022

(65) Prior Publication Data
US 2023/0276153 A1    Aug. 31, 2023

(30) Foreign Application Priority Data
Aug. 27, 2020   (CN) .................. 202010880263.1

(51) Int. Cl.
*H04Q 11/00*    (2006.01)
(52) U.S. Cl.
CPC ..... *H04Q 11/0067* (2013.01); *H04Q 11/0005* (2013.01); *H04Q 2011/0073* (2013.01); *H04Q 2011/0086* (2013.01)

(58) Field of Classification Search
None
See application file for complete search history.

(56) References Cited

U.S. PATENT DOCUMENTS 8,736,826 B2 *  5/2014  Lovely ............... G01D 5/35351
                                                       356/73.1
8,977,122 B2    3/2015  Zhao
(Continued)

FOREIGN PATENT DOCUMENTS

| CN | 101640817 A | 2/2010 |
|----|-------------|--------|
| CN | 102611633 A | 7/2012 |

(Continued)

OTHER PUBLICATIONS

International Searching Authority. International Search Report and Written Opinion for PCT Application No. PCT/CN2021/112080 and English translation, mailed Sep. 27, 2021, pp. 1-10.

(Continued)

*Primary Examiner* — Darren E Wolf
(74) *Attorney, Agent, or Firm* — Vivacqua Crane, PLLC

(57) ABSTRACT

A route calculation method, route calculation apparatus, and storage medium for an Optical Transport Network (OTN) are disclosed. The route calculation method is applied to a path computation element (PCE), and may include: receiving a route computation request (S100); invoking a K-Shortest Path (KSP) algorithm to obtain a plurality of routing results according to the KSP algorithm, and performing resource allocation for the plurality of routing results simultaneously (S200); and determining the routing result for which the resource allocation has been completed as a candidate result, and determining a route computation result of the route computation request according to the candidate result (S300).

20 Claims, 8 Drawing Sheets

(56) References Cited

U.S. PATENT DOCUMENTS

| | | | | |
|---|---|---|---|---|
| 2004/0190902 | A1* | 9/2004 | Tamai | H04L 45/00 |
| | | | | 398/68 |
| 2007/0212068 | A1* | 9/2007 | Miyazaki | H04J 14/0286 |
| | | | | 398/57 |
| 2011/0318021 | A1* | 12/2011 | Zhou | H04L 27/0014 |
| | | | | 375/376 |
| 2012/0163814 | A1* | 6/2012 | Zhao | H04J 14/0267 |
| | | | | 398/48 |
| 2014/0233946 | A1* | 8/2014 | Gerstel | H04L 45/125 |
| | | | | 398/45 |
| 2016/0182154 | A1* | 6/2016 | Fang | H04B 10/2575 |
| | | | | 398/116 |

FOREIGN PATENT DOCUMENTS

| | | | |
|---|---|---|---|
| CN | 104704759 | A | 6/2015 |
| CN | 105207859 | A | 12/2015 |

OTHER PUBLICATIONS

Ajwani, D., et al. An Empirical Comparison of k-Shortest Simple Path Algorithms on Multicores, ICPP 2018, pp. 1-12.

European Patent Office. Extended European Search Report for EP Application No. 21860144.1, mailed Oct. 17, 2023, pp. 1-11.

Xu, C., et al. "Multiple Constrained Routing Algorithms in Large-Scaled Software Defined Networks," Zhejiang University, China, Feb. 28, 2019, pp. 1-15.

\* cited by examiner

OPTICAL TRANSPORT NETWORK ROUTE CALCULATION METHOD, ROUTE CALCULATION APPARATUS, AND STORAGE MEDIUM

CROSS-REFERENCE TO RELATED APPLICATION

The present disclosure is a national stage filing under 35 U.S.C. § 371 of international application number PCT/CN2021/112080, filed Aug. 11, 2021, which claims priority to Chinese patent application No. 202010880263.1 filed Aug. 27, 2020. The entire contents of these applications are incorporated herein by reference in their entirety.

TECHNICAL FIELD

The present disclosure relates to the technical field of communications, and in particular, to a route computation method and a route computation apparatus for an Optical Transport Network (OTN), and a storage medium.

BACKGROUND

At present, the route computation and resource allocation of Optical Transport Networks (OTNs) are mainly undertaken by a Path Computation Element (PCE). When receiving a service route computation request, the PCE computes a routing result containing a network element and a Traffic Engineering (TE) link according to a TE database and a preset K-Shortest Path (KSP) algorithm, and allocate relevant resources for the calculated routing result to obtain a target routing result corresponding to the routing result. If the resource allocation for the current routing result fails, the PCE invokes the KSP algorithm to calculate a next routing result and perform resource allocation again until the resource allocation for one of the routing results is successful or until the number of times of routing result computation exceeds a certain number preset by the KSP algorithm. Obviously, every time the PCE performs resource allocation for a routing result, the PCE has to wait for the result of the allocation. As a result, the route computation efficiency is low, which cannot be adapted to network scenarios with increasingly complex resources.

SUMMARY

The following is a summary of the subject matter set forth in this description. This summary is not intended to limit the scope of protection of the claims.

Embodiments of the present disclosure provide a route computation method and apparatus for an OTN, and a storage medium.

In accordance with an aspect of the present disclosure, an embodiment provides a route computation method for an OTN, which is applied to a PCE. The route computation method may include: receiving a route computation request; invoking a K-Shortest Path (KSP) algorithm to obtain a plurality of routing results according to the KSP algorithm, and performing resource allocation for the plurality of routing results simultaneously; and determining the routing result for which the resource allocation has been completed as a candidate result, and determining a route computation result of the route computation request according to the candidate result.

In accordance with another aspect of the present disclosure, an embodiment provides a route computation apparatus for an OTN. The apparatus may include: at least one processor; and a memory communicatively connected to the at least one processor, where the memory stores instructions executable by the at least one processor which, when executed by the at least one processor, causes the at least one processor to implement the foregoing route computation method for an OTN.

In accordance with another aspect of the present disclosure, an embodiment provides a computer-readable storage medium storing computer-executable instructions which, when executed by a computer, causes the computer to implement the foregoing route computation method for an OTN.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, but do not constitute a limitation to the technical schemes of the present disclosure.

DETAILED DESCRIPTION

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

Embodiments of the present disclosure provide a route computation method, a route computation apparatus for an OTN, and a storage medium, where resources are allocated according to a plurality of routing results obtained by a KSP algorithm simultaneously in order to accelerate the route computation speed and enhance the route computation efficiency for a current route computation request, thereby achieving fast route solving.

The embodiments of the present disclosure will be further described in detail below in junction with the accompanying drawings.

Figure 1:
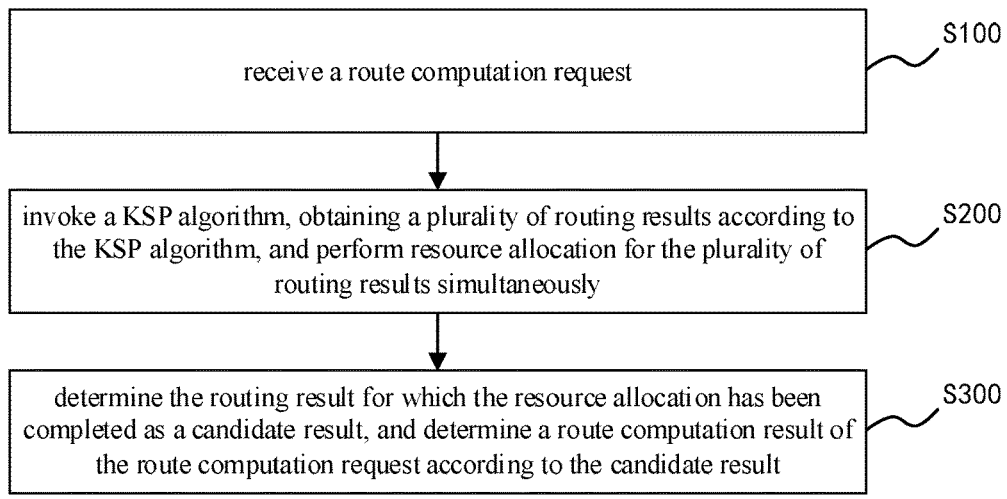
FIG. 1 is a flowchart of a route computation method for an OTN according to an embodiment of the present disclosure.

Referring to FIG. 1, according to an aspect the present disclosure, an embodiment provides a route computation method for an OTN, which is applied to a PCE. The route computation method includes, but are not limited to, steps S100, S200, and S300.

At the step S100, a route computation request is received.

At present, the route computation and resource allocation of OTNs and OTN devices are mainly undertaken by a PCE module. Generally, the PCE module includes a route computation module and a resource allocation module, which are respectively responsible for computing routing results according to requests and allocating network resources for the obtained routing results. When the PCE receives a route computation request for certain service data, the route computation module invokes a KSP algorithm to calculate a routing result containing a network element and a TE link based on network elements in a current OTN and a connection relationship of links between the network elements, and the resource allocation module allocates wavelength resources according to the routing result and a resource status of a TE database. If the resource allocation fails, the KSP algorithm is invoked to obtain a next routing result, and then resource allocation is performed for the next routing result, until the resource allocation for one of the routing results is successful or until the number of times of routing result calculation exceeds a certain number preset by the KSP algorithm. It can be seen that every time a routing result is obtained by the KSP algorithm, it is required to wait for the result of resource allocation for the routing result. If resources cannot be successfully allocated for the first several routing results obtained by the KSP algorithm, it indicates that a long time has elapsed since the receiving of the route computation request, which obviously does not meet the requirements of the OTN for quick response. With the introduction of flexible grid technology into the OTN, the complexity of route computation in the OTN has been greatly increased. The existing KSP algorithm can no longer adapt to the current resource situation of the OTN by improving the computing power of hardware alone.

It can be understood that the route computation request in this embodiment is a route computation request for service data transmission. The service request is a single service request involving a bi-direction service. A source node and a destination node in the route computation request are determined in advance. After receiving the route computation request in step S100, the PCE obtains information about the source node and the destination node, and starts route computation.

At the step S200, a KSP algorithm is invoked, a plurality of routing results are obtained according to the KSP algorithm, and resources are allocated according to the plurality of routing results simultaneously.

In this embodiment, in the step S200, the KSP algorithm is invoked according to the source node, the destination node, the network elements in the current OTN, and a connection relationship of TE links between the network elements, to obtain the plurality of routing results. According to a calculation rule of the KSP algorithm, every time the KSP algorithm is invoked, a routing result will be obtained. For example, the routing result obtained by the first invocation of the KSP algorithm is a first optimal routing result (best routing result), and the routing result obtained by the second invocation of the KSP algorithm is a second optimal routing result (second best routing result), and so on. Therefore, the routing results sequentially obtained by the KSP algorithm are arranged in order of priority, where the first optimal routing result has the highest priority, and the second optimal routing result has the second highest priority. In this embodiment, each time a routing result is obtained according to the KSP algorithm, resource allocation is immediately performed for the routing result, and resource allocation is also performed for a next optimal routing result without waiting for a result of resource allocation for the current routing result, thereby achieving simultaneous resource allocation for a plurality of routing results. In an embodiment, during the process of performing resource allocation for the plurality of routing results, the routing result for which the resource allocation has been completed is determined as a candidate result, and a final route computation result is determined from the candidate results according to the route computation request. Compared with conventional route computation methods, the route computation method of the present disclosure can greatly save time and improve the route computation efficiency.

It should be noted that in an embodiment, a main thread and a plurality of resource allocation threads may be set in the PCE in order to realize the simultaneous resource allocation. Each resource allocation thread can perform resource allocation for a routing result. When the main thread allocates different routing results to the plurality of resource allocation threads, resource allocation may be simultaneously performed for the plurality of routing results without waiting for the results of resource allocation based on an order of the routing results. It may be understood that because the KSP algorithm obtains the routing results according to the order of priority, each routing result may be allocated to a resource allocation thread as soon as the routing result is obtained, or after a preset number of n routing results are calculated by the KSP algorithm, the n routing results are allocated to resource allocation threads.

The resource allocation thread in this embodiment is a hardware level computing thread, which requires the PCE or hardware invoked by the PCE to include a multi-core central processing unit (CPU) and be equipped with a corresponding underlying package to support the PCE in invoking multiple cores to perform multi-thread computing.

At the step S300, the routing result for which the resource allocation has been completed is determined as a candidate result, and a route computation result of the route computation request is determined according to the candidate result.

According to the requirements of the route computation request for the routing result, it is determined which routing result for which the resource allocation has been completed is taken as the candidate result. For example, the routing result for which the resource allocation is completed earliest, among the plurality of routing results for which the resource allocation is performed, is determined as the final route computation result. This can meet the requirement for a quick obtaining of the route computation result. For another example, if the best route computation result is obtained considering an optimal-path constraint, a plurality of routing results for which the resource allocation has been completed, among the plurality of routing results for which the resource allocation is performed, are determined as the candidate results. And then, the candidate result with the highest priority is selected from the candidate results as the final route computation result. The selection of the route computation result will be described in detail in the following embodiments.

Figure 2:
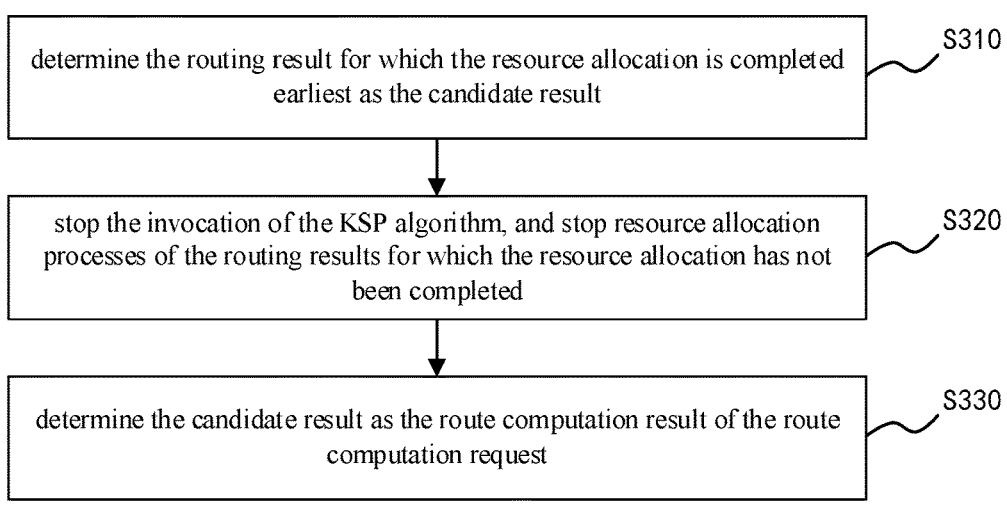
FIG. 2 is a flowchart of a route computation method for an OTN according to another embodiment of the present disclosure.

The improvement made on the route computation method in the embodiments of the present disclosure is independent of the specific route computation scenario and the resource allocation algorithm, and therefore is compatible with existing fixed grid and flexible grid scenarios, supports optical damage verification and various nonlinear constraint scenarios, supports route computation scenarios of service establishment and real time service rerouting recovery, and improves the route computation efficiency and the speed of obtaining the route computation result by simultaneously performing resource allocation In an embodiment, referring to FIG. 2, the step S300 includes, but is not limited to, steps S310, S320, and S330.

At the step S310, the routing result for which the resource allocation is completed earliest is determined as the candidate result.

In this embodiment, when the route computation request requires the shortest route computation time, that is, when the route computation request aims to compute any routing result, the routing result for which the resource allocation is completed earliest is selected as the candidate result. It should be noted that the speed of resource allocation is related to the current resource situation of the OTN. A more complex resource situation indicates a longer resource allocation time. For example, the larger the hop count between the source node and the destination node, the longer the resource allocation time will be provided other resource factors are the same. The embodiments of the present disclosure do not need to consider the resource situation of the OTN, and only needs to consider the routing result for which the resource allocation is completed earliest on the premise that the same resource allocation algorithm simultaneously performs resource allocation for the routing results.

At the step S320, the invocation of the KSP algorithm is stopped, and resource allocation processes of the routing results for which the resource allocation has not been completed are stopped.

Because the candidate results required by the current route computation request have been obtained in the step S310, the other route computation for which the resource allocation is being performed are no longer needed, and no resource allocation is required for subsequently obtained routing results. Therefore, after obtaining information indicating that the resource allocation is successful, the PCE stops the invocation of the KSP algorithm and stops the resource allocation processes of the other routing results. For example, a plurality of resource allocation threads simultaneously perform resource allocation. When resources are successfully allocated for the routing result in one of the resource allocation threads, information indicating successful resource allocation is sent to the main thread and the other resource allocation threads. The main thread stops the invocation of the KSP algorithm according to the information, and the other resource allocation threads stop respective resource allocation processes according to the information.

At the step S330, the candidate result is determined as the route computation result of the route computation request.

After the routing result for which the resource allocation is completed earliest is determined, the resource allocation processes of the other routing results are stopped according to the step S320. Therefore, the route computation result outputted by the PCE is the routing result for which the resource allocation has been completed, which is outputted to obtain the route computation result of service data from the source node to the destination node.

The shortest time is used as a determination criterion to obtain the route computation result, and the resource allocation processes of the other routing results for which the resource allocation has not been completed are stopped. This can reduce computing resource overheads of the PCE and avoid unnecessary computing processes, thereby enabling the PCE to process a next route computation request more quickly.

Figure 3:
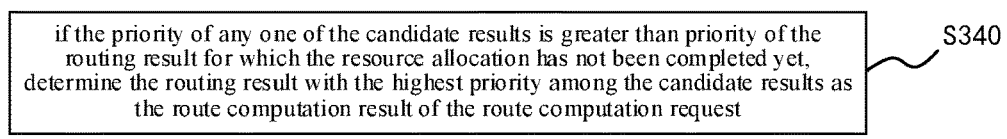
FIG. 3 is a flowchart of a route computation method for an OTN according to another embodiment of the present disclosure.

In an embodiment, referring to FIG. 3, when there are a plurality of candidate results, the determining the route computation result of the route computation request according to the candidate result in the step S300 is realized by performing a following step S340.

At the step S340, when the priority of any one of the candidate results is greater than the priority of the routing result for which the resource allocation has not been completed yet, the routing result with the highest priority among the candidate results is determined as the route computation result of the route computation request.

In this embodiment, the route computation request requires the computation of an optimal path. Generally, the optimal path refers to one or more of the shortest path, a path with the least delay, a path with the least weight cost, or a path with the smallest hop count on the premise of meeting resource constraints. Under such constraints, different routing results are calculated by the KSP algorithm based on a constraint order. Each routing result corresponds to a priority. The value of the priority indicates the degree to which the constraints are met. For example, the first optimal routing result obtained by the KSP algorithm is the route that best meets the constraints. However, the resource allocation for the first optimal routing result may be not successful. Therefore, in this case, the second best or third best routing result is selected as the optimal path. In this embodiment, a plurality of routing results for which resources are successfully allocated are determined as the candidate results. In this case, the routing result with the lowest priority among the candidate results is greater than the priority of any routing result for which the resource allocation has not been completed (that is, the priority of any routing result among the candidate results is greater than the priority of any routing result for which the resource allocation has not been completed). Then, it can be determined that the candidate result with the highest priority among the candidate results satisfies the current route computation request, and the candidate result is determined as the final route computation result.

Figure 4:
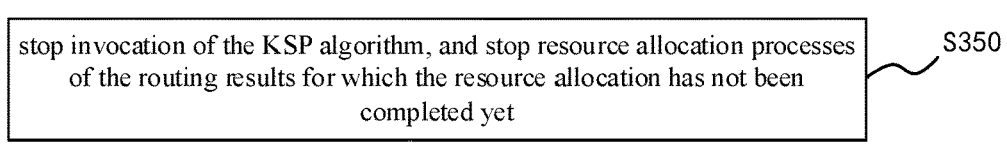
FIG. 4 is a flowchart of a route computation method for an OTN according to another embodiment of the present disclosure.

Based on the above embodiments, in another embodiment, referring to FIG. 4, the method further includes a following step S350.

At the step S350, the invocation of the KSP algorithm is stopped, and resource allocation processes of the routing results for which the resource allocation has not been completed yet are stopped.

Because the priority of any routing result among the candidate results is greater than the priority of any routing result for which the resource allocation has not been completed, there is no need to perform resource allocation for the routing results for which the resource allocation has not been completed, and the routing results for which the resource allocation has not been completed will not be selected as the final route computation result. In addition, according to the characteristics of the KSP algorithm, none of subsequently obtained routing results has higher priority than the current candidate results. Therefore, the invocation of the KSP algorithm can be stopped to reduce the resource consumption of the PCE and avoid unnecessary computing processes, thereby enabling the PCE to process a next route computation request more quickly.

Figure 5:
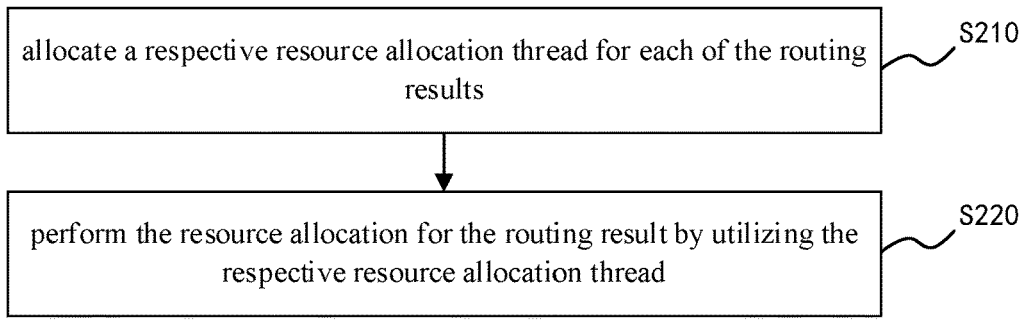
FIG. 5 is a flowchart of a route computation method for an OTN according to another embodiment of the present disclosure.

In an embodiment, referring to FIG. 5, the performing resource allocation for the plurality of routing results simultaneously in the step S200 is realized by performing, for example, but not limited to, the following steps S210 to S220.

At the step S210, a respective resource allocation thread is allocated for each of the routing results.

At the step S220, resource allocation is performed for each of the routing results by utilizing the respective resource allocation thread.

In this embodiment, the resource allocation is performed for the routing result based on a hardware level thread. In terms of hardware, a configuration of a main thread and a plurality of resource allocation threads is set based on a multi-core CPU. The main thread is configured for invoking the KSP algorithm to obtain a routing result, and send the routing result and a resource allocation request to the resource allocation threads. When there is an idle resource allocation thread, the resource allocation thread receives the resource allocation request and the corresponding routing result sent by the main thread, and performs resource allocation for the routing result. In this embodiment, each resource allocation thread performs resource allocation for only one routing result. When a resource allocation thread receives the routing result and performs resource allocation, the resource allocation thread changes from an idle state to a running state, and therefore will not receive a next resource allocation request. After completing the resource allocation for the current routing result (successful allocation or failed allocation), the resource allocation thread changes from the running state to the idle state, and therefore can receive a next resource allocation request. By setting a plurality of resource allocation threads and setting each resource allocation thread to perform resource allocation for one routing result, the resource allocation can be performed simultaneously for a plurality of routing results. The embodiments of the present disclosure make full use of computing resources of the current multi-core CPU, reduce the idle rate of the CPU, and can greatly improve the resource allocation efficiency due to a high computing capacity of the hardware level thread. If a software level process is used to perform resource allocation for a plurality of routing results, the software level process cannot achieve the same efficiency as the hardware level thread because the invocation of multiple cores in hardware is limited by system processes.

Figure 6:
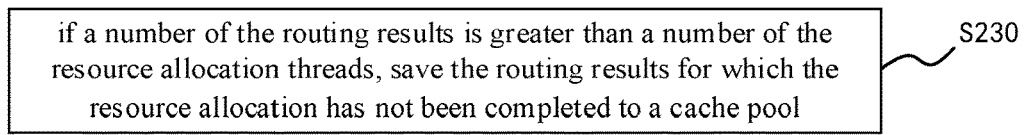
FIG. 6 is a flowchart of a route computation method for an OTN according to another embodiment of the present disclosure.

Based on the above embodiments, in the process of allocating a resource allocation thread for each of the routing results, when the number of routing results obtained is greater than a preset number of resource allocation threads, the routing results may be processed according to a step S230, referring to FIG. 6.

At the step 230, when the number of the routing results is greater than the number of the resource allocation threads, the routing results for which the resource allocation has not been performed are saved to a cache pool.

The cache pool is an independently set storage space for storing routing results in this embodiment. Because the number of the routing results may be greater than the number of the resource allocation threads, the routing results for which the resource allocation has not been performed are saved to the cache pool. It should be understood that according to the characteristics of routing results obtained in turn by the KSP algorithm, the later the routing result is obtained, the lower the priority of the routing result will be. These routing results are directly saved to the cache pool, regardless of whether the current resource allocation thread has changed to the idle state. For example, i resource allocation threads are preset to perform resource allocation for the first i routing results. When a $j^{th}$ routing result (where i<j) is calculated, there happens to be a resource allocation thread which fails the resource allocation and changes to the idle state, and j-i-1 routing results are already stored in the current cache pool; in this case, the $j^{th}$ routing result does not preempt the resource allocation thread that changes to the idle state, but instead, is directly saved to the cache pool. The PCE reads an $(i+1)^{th}$ routing result from the cache pool and performs resource allocation, which is realized by performing a following step S240, referring to FIG. 7.

At the step S240, when there is an idle resource allocation thread, the routing result with the highest priority in the cache pool is allocated to the idle resource allocation thread.

It is assumed that a plurality of routing results are stored in the cache pool. In order to allocate resources for the routing result with high priority first, it is set that when an idle resource allocation thread appears, the routing result with the highest priority in the cache pool is allocated to the idle resource allocation thread, so that resources are preferentially allocated for the routing result with higher priority, and the final route computation result obtained is the routing result with higher priority.

In the process of resource allocation, it is also necessary to process the routing results in the cache pool according to an actual situation. For example, in an embodiment, a step S250 is performed to clear the routing results in the cache pool to prevent the cache pool from piling up, referring to FIG. 8.

At the step S250, when the resource allocation has been completed for any one of the routing results, all the routing results in the cache pool are cleared.

When the resource allocation for the routing result in one of the resource allocation threads has been completed, it indicates that a candidate result with higher priority than the routing results in the cache pool is already obtained. In this case, it is no longer necessary to perform resource allocation for the routing results in the cache pool, so that the routing results in the cache pool can be cleared to prevent routing results from piling up in the cache pool. It should be understood that it is necessary to check whether the cache pool is empty prior to the step S250. If the cache pool is empty, the step S250 does not need to be performed.

Figure 9:
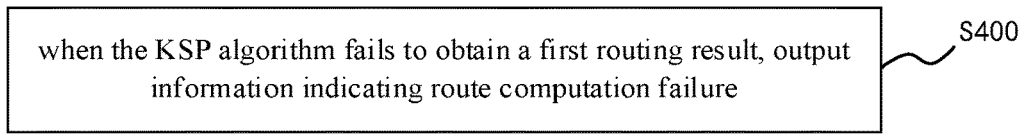
FIG. 9 is a flowchart of a route computation method for an OTN according to another embodiment of the present disclosure.

In an embodiment, referring to FIG. 9, the method further includes a step S400.

At the step S400, when the KSP algorithm fails to obtain a first routing result, information indicating route computation failure is outputted.

In this embodiment, if the KSP algorithm cannot obtain the first routing result, it indicates that there are currently no available resources for links between the source node and other nodes in the OTN, and therefore the KSP algorithm cannot obtain subsequent routing results. In this case, failure of the current route computation request is directly outputted.

Figure 10:
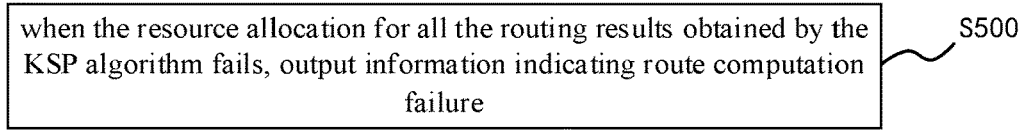
FIG. 10 is a flowchart of a route computation method for an OTN according to another embodiment of the present disclosure.

In an embodiment, referring to FIG. 10, the method further includes a step S500.

At the step S500, when the resource allocation for all the routing results obtained by the KSP algorithm fails, information indicating route computation failure is outputted.

In one case, the number of feasible routing results in the OTN is less than or equal to a preset K value of the KSP algorithm (where K represents a manually set number of times of route computation performed by the KSP algorithm). In this case, all routing results of the OTN are obtained according to the KSP algorithm. If the resource allocation for all the routing results fails, it indicates no route computation result can be obtained for the current route computation request. Therefore, failure of the current route computation request is directly outputted, and the computation is ended. In another case, the number of feasible routing results in the OTN is greater than the preset K value of the KSP algorithm. When the KSP algorithm executes k times of route computation (obtaining k routing results) and the resource allocation for all the k routing results fails, it indicates no route computation result can be obtained for the current route computation request. Therefore, failure of the current route computation request is directly outputted, and the computation is ended.

The embodiments of the present disclosure are described below in conjunction with several practical examples.

Example One: An example where resources are successfully allocated for the first optimal routing result obtained by invoking the KSP algorithm.

Figure 11:
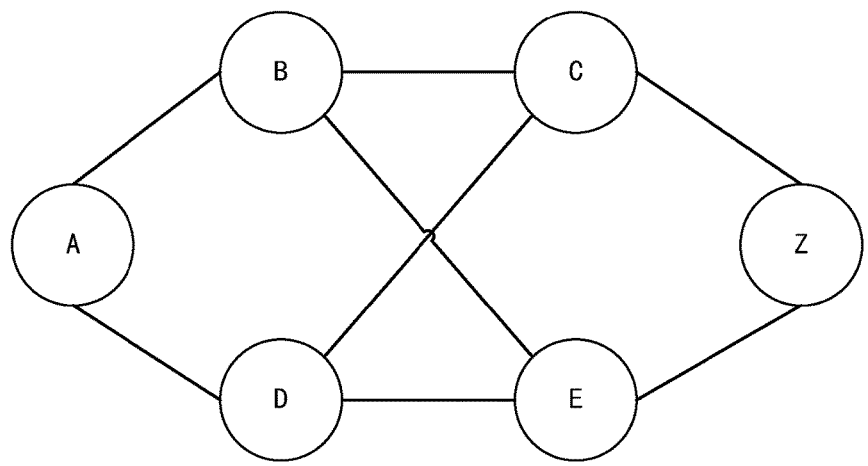
FIG. 11 is an abstract diagram of a network element connection relationship according to Example One of the present disclosure.

Referring to FIG. 11, FIG. 11 is an abstract diagram of a network element connection relationship in a current OTN. The OTN includes six network elements, namely, network element A, network element B, network element C, network element D, network element E, and network element Z. The network element A and the network element Z are a source node and a destination node, respectively, which support service upstream and downstream. For ease of description, it is assumed that the rest of the network elements only serve as pass-through stations, and that link weights (TE-metric) of bidirectional TE links between the network elements are identical. A fixed grid scenario is adopted in the current OTN. All upstream and downstream service board ports in the network elements have been specified, and all spectrum resources of each optical transport port from the service board to the source node and the destination node are available. Therefore, in the resource allocation process of Example One, only the resource situation on the TE link needs to be considered. Because the link weights of the TE links in the current OTN are identical, it is only necessary to obtain the route computation result for the route computation request of Example One without considering the route priority in practice.

In a PCE, one main thread and three resource allocation threads are also set to start, and a maximum number of times of route computation for the KSP algorithm is set to 5 (that is, the value of K is 5).

Figure 12:
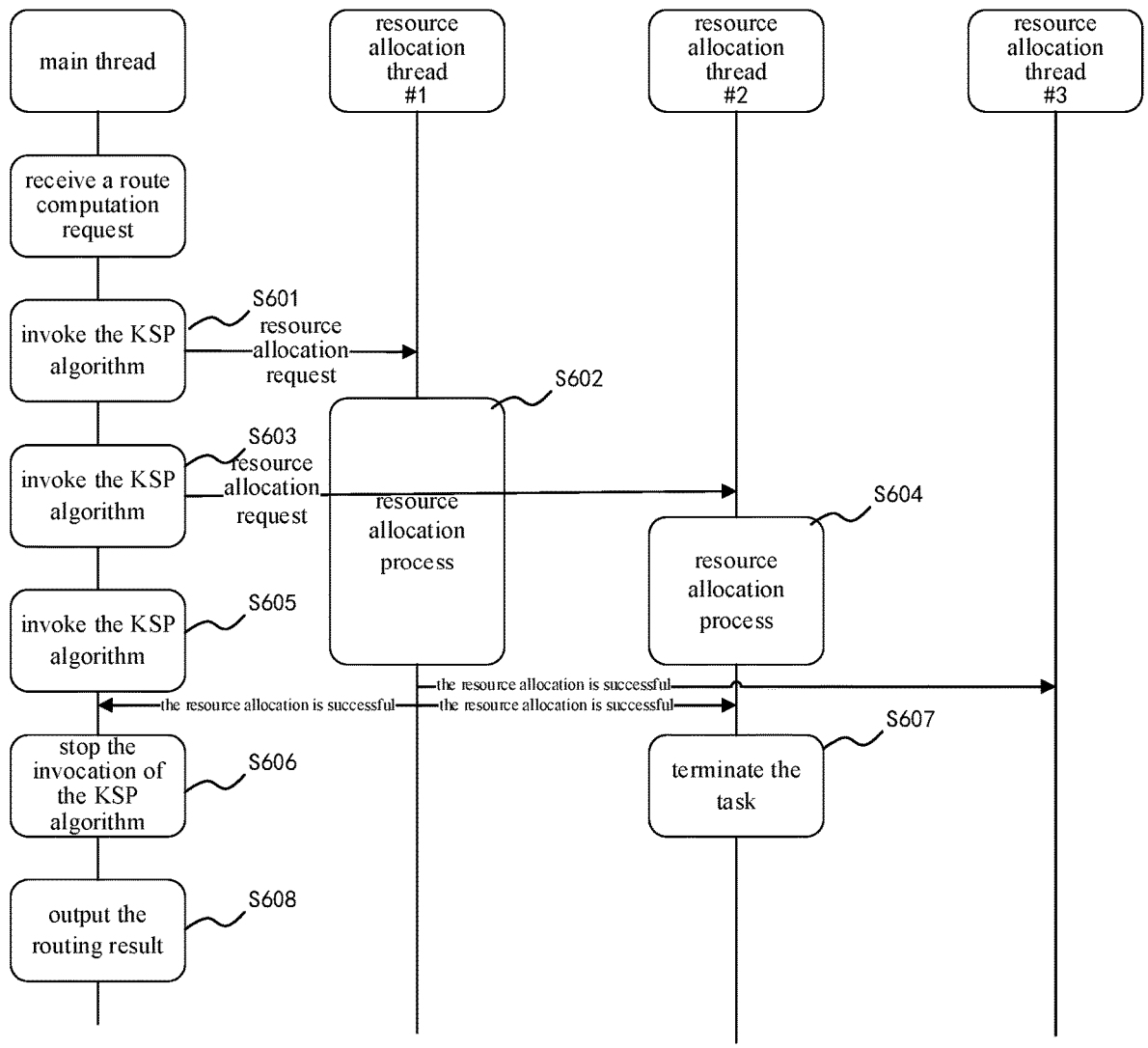
FIG. 12 is a flowchart of a route computation method for an OTN according to Example One of the present disclosure.

When the PCE receives a route computation request for certain service data, the PCE starts a route computation process. Referring to FIG. 12, FIG. 12 shows a flowchart of actions of and message interaction between the main thread and the resource allocation threads in the route computation process of Example One. The process includes following steps S601 to S608.

At the step S601, the main thread invokes the KSP algorithm to obtain a first optimal routing result: A-B-C-Z, finds through query that there is an idle resource allocation thread #1, and sends a resource allocation request and the first optimal routing result to the resource allocation thread #1.

At the step S602, the resource allocation thread #1 receives the resource allocation request and the first optimal routing result, and starts to allocate resources for the first optimal routing result.

At the step S603, the main thread invokes the KSP algorithm to obtain a second optimal routing result: A-B-E-Z, finds through query that there is an idle resource allocation thread #2, and sends a resource allocation request and the second optimal routing result to the resource allocation thread #2.

At the step S604, the resource allocation thread #2 receives the resource allocation request and the second optimal routing result, and starts to allocate resources for the second optimal routing result.

At the step S605, the main thread invokes the KSP algorithm to obtain a third optimal routing result: A-D-E-Z. At this time, if the resource allocation thread #1 successfully allocates resources for the first optimal routing result, the resource allocation thread #1 sends information indicating successful resource allocation to the main thread, the resource allocation thread #2, and a resource allocation thread #3, and returns the routing result for which the resource allocation has been completed to the main thread.

At the step S606, the main thread receives the information indicating successful resource allocation and the routing result for which the resource allocation has been completed, stops the invocation of the KSP algorithm, and determines the received routing result as a candidate result.

At the step S607, the resource allocation thread #2 receives the information indicating successful resource allocation and stops its own resource allocation process. Because the resource allocation thread #3 does not perform resource allocation, the resource allocation thread #3 does not need to perform any action.

At the step S608, the main thread outputs the candidate result as a route computation result of the route computation request.

Example Two: An example where the first optimal routing result cannot be obtained by invoking the KSP algorithm.

Figure 13:
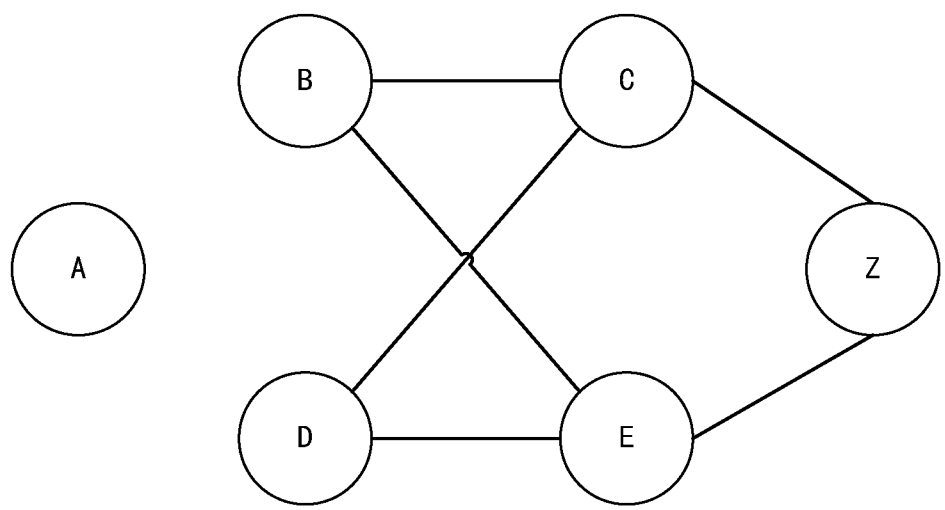
FIG. 13 is an abstract diagram of a network element connection relationship according to Example Two of the present disclosure.

Conditions set in Example Two are the identical as those set in Example One, except that the TE link between A-B and the TE link between A-D have no available spectrum resources. An abstract diagram of a network element connection relationship in Example Two is shown in FIG. 13.

When the PCE receives a route computation request for certain service data, the PCE starts a route computation process.

The main thread cannot obtain any valid path from the network element A to the network element Z by invoking the KSP algorithm. In this case, the main thread determines that the KSP algorithm cannot obtain the first optimal routing result, and outputs information indicating route computation failure.

Example Three: An example where resources are successfully allocated for an mth optimal routing result obtained by invoking the KSP algorithm, with m being greater than the number of resource allocation threads.

Figure 14:
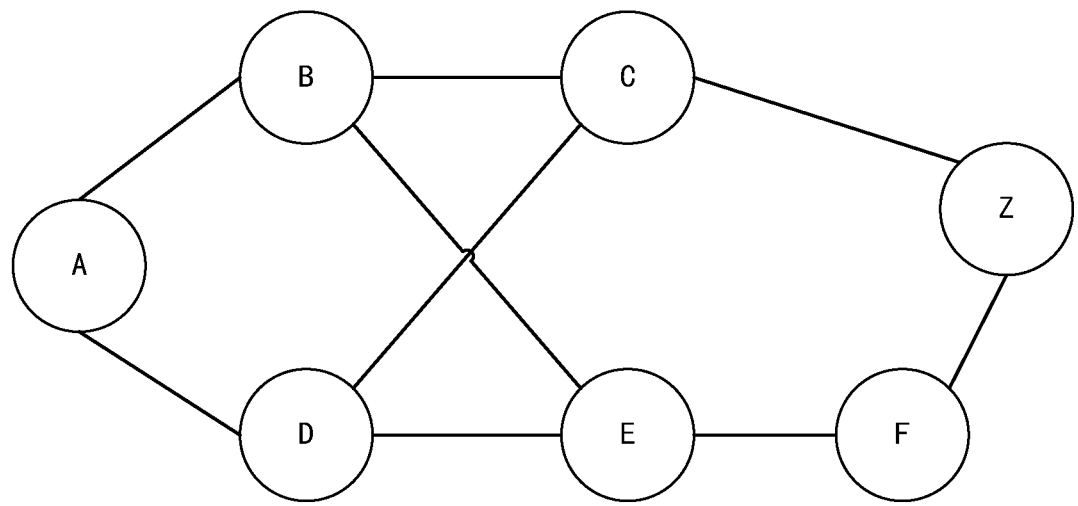
FIG. 14 is an abstract diagram of a network element connection relationship according to Example Three of the present disclosure.

Referring to FIG. 14, FIG. 14 is an abstract diagram of a network element connection relationship in a current OTN. The OTN includes seven network elements, namely, network element A, network element B, network element C, network element D, network element E, network element F, and network element Z. The network element A and the network element Z are a source node and a destination node, respectively, which support service upstream and downstream. It is assumed that the network element B and the network element E are both equipped with a relay board capable of wavelength conversion, the rest of the network elements only serve as pass-through stations, and link weights (TE-metric) of bidirectional TE links between the network elements are identical. A fixed grid scenario is adopted in the current OTN. All upstream and downstream service board ports in the network elements have been specified, and all spectrum resources of each optical transport port from the service board to the source node and the destination node are available. Because the link weights of the TE links in the current OTN are identical, it is only necessary to obtain the route computation result for the route computation request of Example Three without considering the route priority in practice.

In a PCE, one main thread and three resource allocation threads are also set to start, and a maximum number of times of route computation for the KSP algorithm is set to 10 (that is, the value of K is 10).

Figure 15:
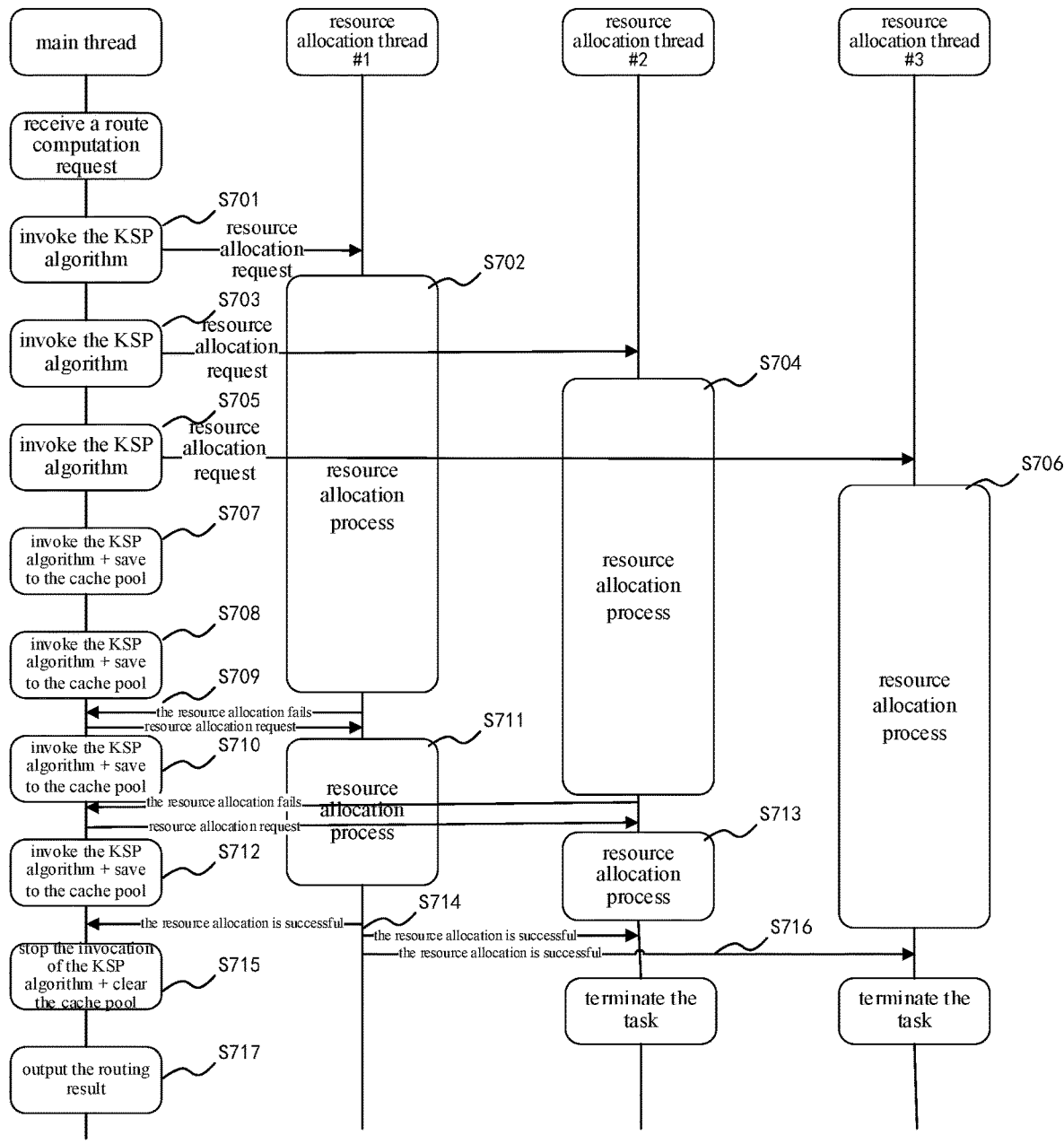
FIG. 15 is a flowchart of a route computation method for an OTN according to Example Three of the present disclosure.

When the PCE receives a route computation request for certain service data, the PCE starts a route computation process. Referring to FIG. 15, FIG. 15 shows a flowchart of actions of and message interaction between the main thread and the resource allocation threads in the route computation process of Example Three. The process includes following steps S701 to S717.

At the step S701, the main thread invokes the KSP algorithm to obtain a first optimal routing result: A-B-C-Z, finds through query that there is an idle resource allocation thread #1, and sends a resource allocation request and the first optimal routing result to the resource allocation thread #1.

At the step S702, the resource allocation thread #1 receives the resource allocation request and the first optimal routing result, and starts to allocate resources for the first optimal routing result.

At the step S703, the main thread invokes the KSP algorithm to obtain a second optimal routing result: A-D-C-Z, finds through query that there is an idle resource allocation thread #2, and sends a resource allocation request and the second optimal routing result to the resource allocation thread #2.

At the step S704, the resource allocation thread #2 receives the resource allocation request and the second optimal routing result, and starts to allocate resources for the second optimal routing result.

At the step S705, the main thread invokes the KSP algorithm to obtain a third optimal routing result: A-B-E-F-Z, finds through query that there is an idle resource allocation thread #3, and sends a resource allocation request and the third optimal routing result to the resource allocation thread #3.

At the step S706, the resource allocation thread #3 receives the resource allocation request and the third optimal routing result, and starts to allocate resources for the third optimal routing result.

At the step S707, the main thread invokes the KSP algorithm to obtain a fourth optimal routing result: A-D-E-F-Z, finds through query that there is no idle resource allocation thread, and saves the fourth optimal routing result to a cache pool.

At the step S708, the main thread invokes the KSP algorithm to obtain a fifth optimal routing result: A-D-E-B-C-Z, finds through query that there is no idle resource allocation thread, and saves the fifth optimal routing result to the cache pool.

At the step S709, if the resource allocation thread #1 fails in allocating resources for the first optimal routing result, the resource allocation thread #1 sends information indicating resource allocation failure to the main thread.

At the step S710, the main thread receives the information indicating resource allocation failure sent by the resource allocation thread #1, finds through query that the cache pool is not empty, and sends the fourth optimal routing result in the cache pool to the resource allocation thread #1. At the same time, the main thread continues to invoke the KSP algorithm to obtain a sixth optimal routing result: A-B-E-D-C-Z, and saves the sixth optimal routing result to the cache pool.

At the step S711, the resource allocation thread #1 receives the resource allocation request and the fourth optimal routing result, and starts to allocate resources for the fourth optimal routing result.

At the step S712, the main thread receives the information indicating resource allocation failure sent by the resource allocation thread #2, finds through query that the cache pool is not empty, and sends the fifth optimal routing result in the cache pool to the resource allocation thread #2. At the same time, the main thread continues to invoke the KSP algorithm to obtain a seventh optimal routing result: A-B-C-D-E-E-Z, and saves the seventh optimal routing result to the cache pool.

At the step S713, the resource allocation thread #2 receives the resource allocation request and the fifth optimal routing result, and starts to allocate resources for the fifth optimal routing result.

At the step S714, if the resource allocation thread #1 successfully allocates resources for the fourth optimal routing result, the resource allocation thread #1 sends information indicating successful resource allocation to the main thread, the resource allocation thread #2, and the resource allocation thread #3, and returns the routing result for which the resource allocation has been completed to the main thread.

At the step S715, the main thread receives the information indicating successful resource allocation and the routing result for which the resource allocation has been completed, stops the invocation of the KSP algorithm, clears all the routing results in the cache pool, and determines the received routing result as a candidate result.

At the step S716, the resource allocation thread #2 and the resource allocation thread #3 receive the information indicating successful resource allocation, and stop their respective resource allocation processes.

At the step S717, the main thread outputs the candidate result as a route computation result of the route computation request.

Example Four: An example where the resource allocation for all the routing results obtained by invoking the KSP algorithm fails.

The abstract diagram of the network element connection relationship in Example One shown in FIG. 11 is still taken as an example. Network parameters in Example Four are identical with those in Example One except that center wavelengths of the bidirectional links A-B and A-D are different from those of other bidirectional links, and it is assumed that none of the network elements is equipped with a relay board for wavelength conversion. The others of this example are identical with that of the Example One.

In a PCE, one main thread and three resource allocation threads are also set to start, and a maximum number of times of route computation for the KSP algorithm is set to 10 (that is, the value of K is 10).

Figure 16:
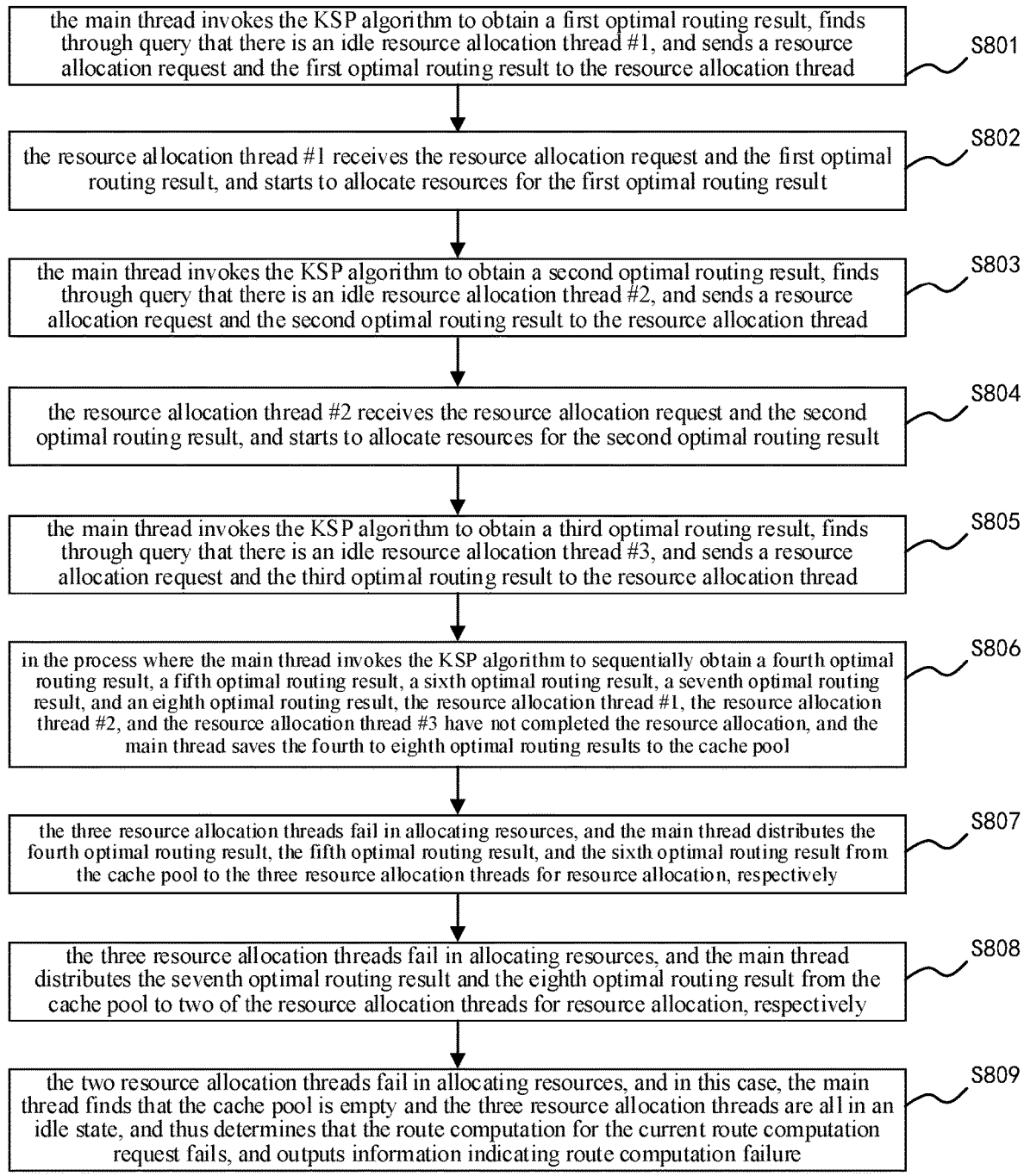
FIG. 16 is a flowchart of a route computation method for an OTN according to Example Four of the present disclosure.

When the PCE receives a route computation request for certain service data, the PCE starts a route computation process. Referring to FIG. 16, FIG. 16 shows a flowchart of actions of and message interaction between the main thread and the resource allocation threads in the route computation process of Example Four. The process includes following steps S801 to S809.

At the step S801, the main thread invokes the KSP algorithm to obtain a first optimal routing result: A-B-C-Z, finds through query that there is an idle resource allocation thread #1, and sends a resource allocation request and the first optimal routing result to the resource allocation thread #1.

At the step S802, the resource allocation thread #1 receives the resource allocation request and the first optimal routing result, and starts to allocate resources for the first optimal routing result.

At the step S803, the main thread invokes the KSP algorithm to obtain a second optimal routing result: A-B-E-Z, finds through query that there is an idle resource allocation thread #2, and sends a resource allocation request and the second optimal routing result to the resource allocation thread #2.

At the step S804, the resource allocation thread #2 receives the resource allocation request and the second optimal routing result, and starts to allocate resources for the second optimal routing result.

At the step S805, the main thread invokes the KSP algorithm to obtain a third optimal routing result: A-D-E-Z, finds through query that there is an idle resource allocation thread #3, and sends a resource allocation request and the third optimal routing result to the resource allocation thread #3.

At the step S806, in the process where the main thread invokes the KSP algorithm to sequentially obtain a fourth optimal routing result, a fifth optimal routing result, a sixth optimal routing result, a seventh optimal routing result, and an eighth optimal routing result, the resource allocation thread #1, the resource allocation thread #2, and the resource allocation thread #3 have not completed the resource allocation, and the main thread saves the fourth to eighth optimal routing results to the cache pool.

At the step S807, the three resource allocation threads fail in allocating resources, and the main thread sends the fourth optimal routing result, the fifth optimal routing result, and the sixth optimal routing result from the cache pool to the three resource allocation threads for resource allocation, respectively.

At the step S808, the three resource allocation threads fail in allocating resources, and the main thread sends the seventh optimal routing result and the eighth optimal routing result from the cache pool to two of the resource allocation threads for resource allocation, respectively.

At the step S809, the two resource allocation threads fail in allocating resources, and in this case, the main thread finds that the cache pool is empty and the three resource allocation threads are all in an idle state, and thus determines that the route computation for the current route computation request fails, and outputs information indicating route computation failure.

Example Five: A resource allocation method considering an optimal-path constraint.

The abstract diagram of the network element connection relationship in Example One shown in FIG. 11 is still taken as an example. Network parameters in Example Five are identical with those in Example One except that the bidirectional TE links have different weights, the center wavelengths of the network elements are different to some extent, and the network element B is equipped with a relay board for wavelength conversion. The spectrum resources and the values of the link weights of the bidirectional TE links are shown in Table 1.

TABLE 1

Table of spectrum resources and link weights of bidirectional TE links

| Bidirectional TE link | Available center wavelength | Link weight |
|---|---|---|
| A-B | $\lambda_1$ | 1 |
| A-D | $\lambda_2$ | 2 |
| B-C | $\lambda_2$ | 1 |
| D-E | $\lambda_2$ | 2 |
| B-E | $\lambda_2$ | 2 |
| C-D | $\lambda_2$ | 2 |
| C-Z | $\lambda_2$ | 2 |
| E-Z | $\lambda_2$ | 2 |

Because the optimal-path constraint is considered in Example Five, the route computation request requires obtaining the best routing result.

In a PCE, one main thread and four resource allocation threads are also set to start, and a maximum number of times of route computation for the KSP algorithm is set to 10 (that is, the value of K is 10).

Based on the above weight data, a sum of link weights included in the routing results calculated according to the KSP algorithm can be obtained, as shown in Table 2:

TABLE 2

Table of weights and data of routing results

| Routing result | Path | The route includes a sum of link weights |
| --- | --- | --- |
| First optimal | A-B-C-Z | 4 |
| Second optimal | A-B-E-Z | 5 |
| Third optimal | A-D-C-Z | 6 |
| Fourth optimal | A-D-E-Z | 6 |
| Fifth optimal | A-B-C-D-E-Z | 8 |
| Sixth optimal | A-B-E-D-C-Z | 9 |
| Seventh optimal | A-D-C-B-E-Z | 9 |

Figure 17:
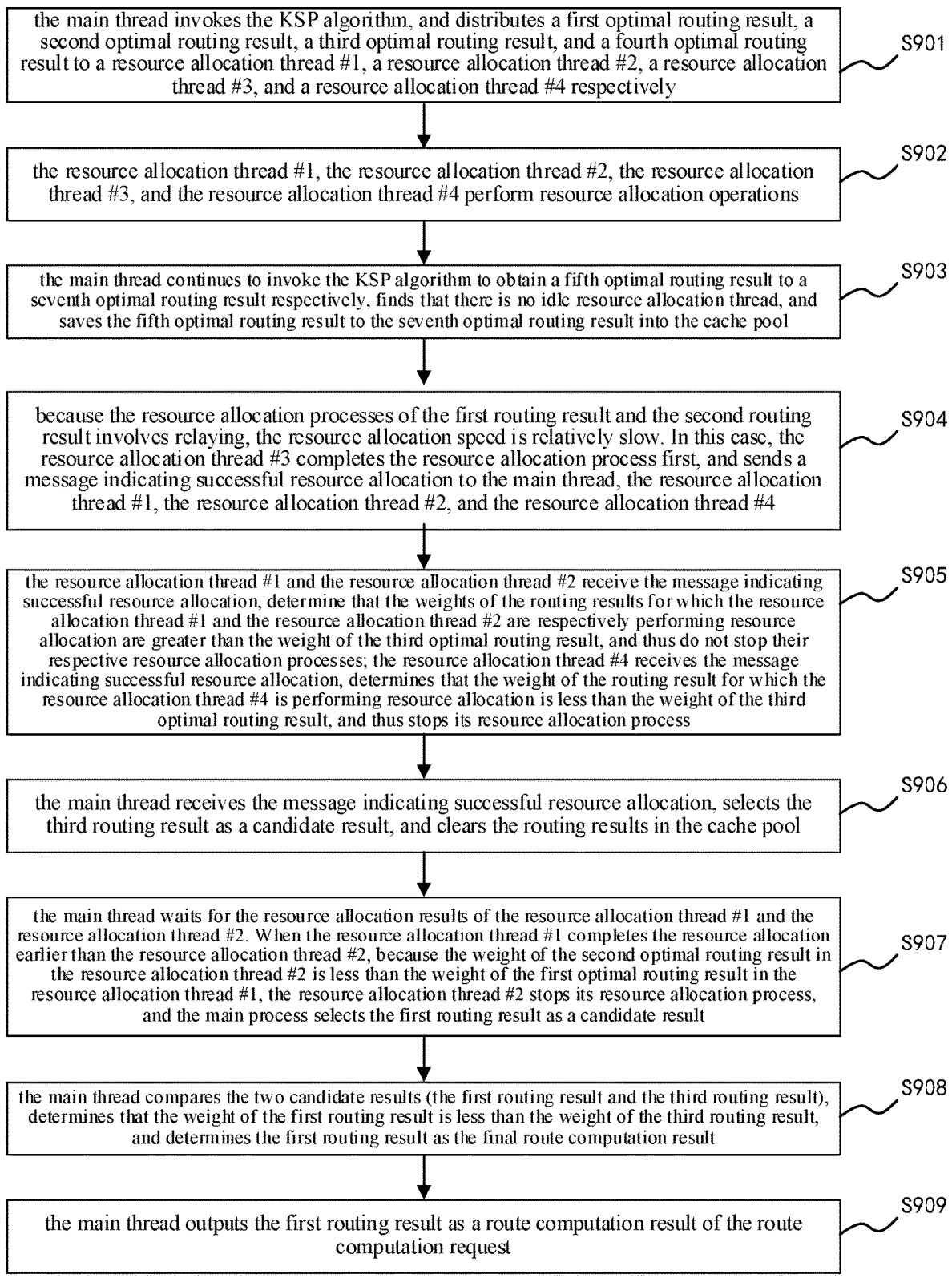
FIG. 17 is a flowchart of a route computation method for an OTN according to Example Five of the present disclosure.

For eases of description, the following briefly describes the process of distributing routing results to the resource allocation threads. For the order of distribution, reference may be made to the above embodiments. Refer to FIG. 17, the process includes following steps S901 to S909.

At the step S901, the main thread invokes the KSP algorithm, and sends a first optimal routing result, a second optimal routing result, a third optimal routing result, and a fourth optimal routing result to a resource allocation thread #1, a resource allocation thread #2, a resource allocation thread #3, and a resource allocation thread #4 respectively.

At the step S902, the resource allocation thread #1, the resource allocation thread #2, the resource allocation thread #3, and the resource allocation thread #4 perform resource allocation operations.

At the step S903, the main thread continues to invoke the KSP algorithm to obtain a fifth optimal routing result to a seventh optimal routing result respectively, finds that there is no idle resource allocation thread, and saves the fifth optimal routing result to the seventh optimal routing result into the cache pool.

At the step S904, because the resource allocation processes of the first routing result and the second routing result involves relaying, the resource allocation speed is relatively slow. In this case, the resource allocation thread #3 completes the resource allocation process first, and sends a message indicating successful resource allocation to the main thread, the resource allocation thread #1, the resource allocation thread #2, and the resource allocation thread #4.

At the step S905, the resource allocation thread #1 and the resource allocation thread #2 receive the message indicating successful resource allocation, determine that the weights of the routing results for which the resource allocation thread #1 and the resource allocation thread #2 are respectively performing resource allocation are less than the weight of the third optimal routing result, and thus do not stop their respective resource allocation processes; the resource allocation thread #4 receives the message indicating successful resource allocation, determines that the weight of the routing result for which the resource allocation thread #4 is performing resource allocation is greater than the weight of the third optimal routing result, and thus stops its resource allocation process.

At the step S906, the main thread receives the message indicating successful resource allocation, selects the third routing result as a candidate result, and clears the routing results in the cache pool.

At the step S907, the main thread waits for the resource allocation results of the resource allocation thread #1 and the resource allocation thread #2. When the resource allocation thread #1 completes the resource allocation earlier than the resource allocation thread #2, because the weight of the second optimal routing result in the resource allocation thread #2 is greater than the weight of the first optimal routing result in the resource allocation thread #1, the resource allocation thread #2 stops its resource allocation process, and the main process selects the first routing result as a candidate result.

At the step S908, the main thread compares the two candidate results (the first routing result and the third routing result), determines that the weight of the first routing result is less than the weight of the third routing result, and determines the first routing result as the final route computation result.

At the step S909, the main thread outputs the first routing result as a route computation result of the route computation request.

According to another aspect of the present disclosure, an embodiment provides a route computation apparatus. The apparatus includes: at least one processor; and a memory communicatively connected to the at least one processor, where the memory stores instructions executable by the at least one processor which, when executed by the at least one processor, causes the at least one processor to implement the route computation method for an OTN described above.

Figure 18:
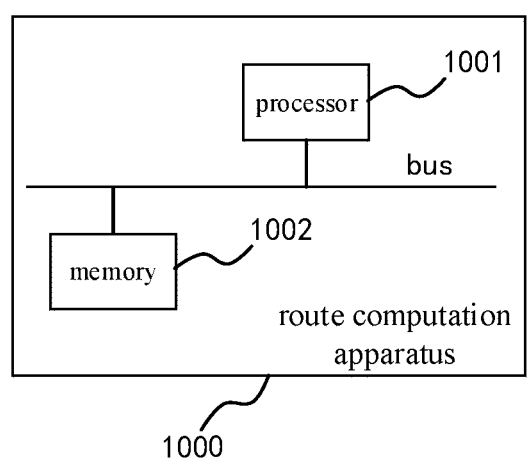
FIG. 18 is a schematic structural diagram of a route computation apparatus according to an embodiment of the present disclosure.

Referring to FIG. 18, for example, a control processor 1001 and a memory 1002 in a route computation apparatus 1000 may be connected via a bus. The memory 1002, as a non-transitory computer-readable storage medium, may be configured for storing a non-transitory software program and a non-transitory computer-executable program. In addition, the memory 1002 may include a high-speed random-access memory, and may also include a non-transitory memory, e.g., at least one magnetic disk storage device, flash memory device, or other non-transitory solid-state storage device. In some implementations, the memory 1002 may include memories located remotely from the control processor 1001, and the remote memories may be connected to the route computation apparatus 1000 via a network. Examples of the network include, but are not limited to, the Internet, an intranet, a local area network, a mobile communication network, and combinations thereof.

Those having ordinary skills in the art may understand that the apparatus structure shown in FIG. 18 does not constitute a limitation to the route computation apparatus 1000, and the route computation apparatus may include more or fewer components than those shown in the figure, or some components may be combined, or a different component arrangement may be used.

According to a route computation request received, a KSP algorithm is invoked to calculate a plurality of routing results, and resource allocation is simultaneously performed for the plurality of routing results, to accelerate the route computation speed for the route computation request. Compared with conventional route computation methods based on the KSP algorithm, the route computation method of the embodiments of the present disclosure can greatly accelerate the route computation speed, improve the route computation efficiency, and meet the requirements of OTNs with more complex resource situations.

According to another aspect of the present disclosure, an embodiment provides a computer-readable storage medium, storing computer-executable instructions which, when executed by one or more control processors, for example, by a control processor 1001 in FIG. 18, may cause the one or more control processors to implement the route computation method for an OTN in the above method embodiments, for example, to execute the foregoing steps S100 to S300 of the method in FIG. 1, steps S310 to S330 of the method in FIG.

Figure 7:
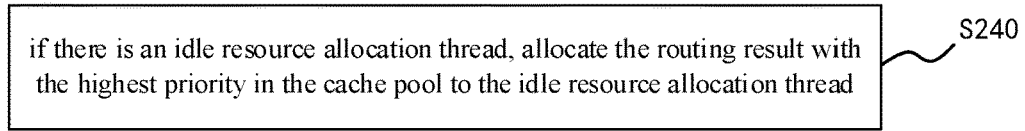
FIG. 7 is a flowchart of a route computation method for an OTN according to another embodiment of the present disclosure.
Figure 8:
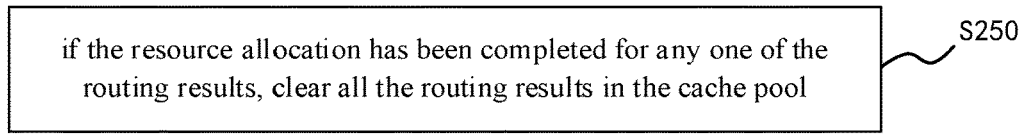
FIG. 8 is a flowchart of a route computation method for an OTN according to another embodiment of the present disclosure.

2, step S340 of the method in FIG. 3, step S350 of the method in FIG. 4, steps S210 to S230 of the method in FIG. 5, step S230 of the method in FIG. 6, step S240 of the method in FIG. 7, step S250 of the method in FIG. 8, step S400 of the method in FIG. 9, step S500 of the method in FIG. 10, steps S601 to S608 of the method in FIG. 12, steps S701 to S717 of the method in FIG. 15, steps S801 to S809 of the method in FIG. 16, and steps S901 to S909 of the method in FIG. 17.

In the route computation method for an OTN that is provided in the embodiments of the present disclosure, according to a route computation request received, a KSP algorithm is invoked to calculate a plurality of routing results, and resource allocation is simultaneously performed for the plurality of routing results, thereby accelerating the route computation speed for the route computation request. For example, the routing results obtained by each invocation of the KSP algorithm are allocated to idle resource allocation threads, and resource allocation is simultaneously performed for different routing results through a plurality of resource allocation threads. Then, the routing results for which the resource allocation has been completed are determined as candidate results, and the final routing result is determined among the candidate results according to the route computation request. Compared with conventional route computation methods based on the KSP algorithm, the route computation method of the embodiments of the present disclosure can greatly accelerate the route computation speed, improve the route computation efficiency, and meet the requirements of OTNs with more complex resource situations.

The apparatus embodiments described above are merely examples. The units described as separate components may or may not be physically separated, i.e., may be located in one place or may be distributed over a plurality of network units. Some or all of the modules may be selected according to actual needs to achieve the objects of the schemes of this embodiment.

Those having ordinary skills in the art can understand that all or some of the steps in the methods disclosed above and system may be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As well known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but is not limited to, a Random Access Memory (RAM), a Read-Only Memory (ROM), an Electrically Erasable Programmable Read-Only Memory (EEPROM), a Flash Memory or other memory technology, a Compact Disc Read-Only Memory (CD-ROM), a Digital Video Disc (DVD) or other optical storage, cassette, magnetic tape, magnetic disk storage or other magnetic storage device, or any other medium which can be used to store the desired information and which can be accessed by a computer. In addition, as well known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited thereto. Those having ordinary skills in the art can make various equivalent modifications or replacements without departing from the scope of the present disclosure. Such equivalent modifications or replacements fall within the scope defined by the claims of the present disclosure.

What is claimed is:

1. A route computation method for an Optical Transport Network (OTN), applied to a Path Computation Element (PCE), the route computation method comprising:
   receiving a route computation request;
   invoking a K-Shortest Path (KSP) algorithm to obtain a plurality of routing results according to the KSP algorithm;
   allocating a respective resource allocation thread for each of the routing results, wherein the respective resource allocation thread is a hardware level computing thread;
   performing resource allocation for each of the plurality of routing results simultaneously by utilizing the respective resource allocation thread;
   defining the routing result for which the resource allocation has been completed as a candidate result; and
   determining a route computation result of the route computation request according to the candidate result.

2. The route computation method for an OTN of claim 1, wherein defining the routing result for which the resource allocation has been completed as a candidate result, and determining a route computation result of the route computation request according to the candidate result comprises:
   defining the routing result for which the resource allocation is completed earliest as the candidate result;
   stopping invocation of the KSP algorithm, and stopping resource allocation processes of the routing results for which the resource allocation has not been completed; and
   defining the candidate result as the route computation result of the route computation request.

3. The route computation method for an OTN of claim 1, wherein
   a plurality of candidate results are determined, and determining a route computation result of the route computation request according to the candidate results comprises:
   in response to priority of any one of the candidate results being greater than priority of the routing result for which the resource allocation has not been completed yet, defining the routing result with the highest priority among the candidate results as the route computation result of the route computation request.

4. The route computation method for an OTN of claim 3, further comprising:
   stopping the invocation of the KSP algorithm, and
   stopping resource allocation processes of the routing results for which the resource allocation has not been completed yet.

5. The route computation method for an OTN of claim 1, wherein during allocating a resource allocation thread for each of the routing results, the method further comprises:
   in response to a number of the routing results being greater than a number of the resource allocation threads, saving the routing results for which the resource allocation has not been performed to a cache pool.

6. The route computation method for an OTN of claim 5, further comprising:
in response to a presence of an idle resource allocation thread, allocating the routing result with the highest priority in the cache pool to the idle resource allocation thread.

7. The route computation method for an OTN of claim 5, further comprising:
in response to the resource allocation having been completed for any one of the routing results, clearing all the routing results in the cache pool.

8. The route computation method for an OTN of claim 1, further comprising:
in response to failing to obtain a first routing result by the KSP algorithm, outputting information indicating route computation failure.

9. The route computation method for an OTN of claim 1, further comprising:
in response to a failure in the resource allocation for all the routing results obtained by the KSP algorithm, outputting information indicating route computation failure.

10. A route computation apparatus for an Optical Transport Network (OTN), comprising:
at least one processor; and
a memory communicatively connected to the at least one processor,
wherein the memory stores instructions executable by the at least one processor which, when executed by the at least one processor, causes the at least one processor to perform:
receiving a route computation request;
invoking a K-Shortest Path (KSP) algorithm to obtain a plurality of routing results according to the KSP algorithm;
allocating a respective resource allocation thread for each of the routing results, wherein the respective resource allocation thread is a hardware level computing thread;
performing resource allocation for each of the plurality of routing results simultaneously by utilizing the respective resource allocation thread;
defining the routing result for which the resource allocation has been completed as a candidate result; and
determining a route computation result of the route computation request according to the candidate result.

11. A non-transitory computer-readable storage medium, storing computer-executable instructions which, when executed by a computer, causes the computer to perform:
receiving a route computation request;
invoking a K-Shortest Path (KSP) algorithm to obtain a plurality of routing results according to the KSP algorithm;
allocating a respective resource allocation thread for each of the routing results, wherein the respective resource allocation thread is a hardware level computing thread;
performing resource allocation for each of the plurality of routing results simultaneously by utilizing the respective resource allocation thread;
defining the routing result for which the resource allocation has been completed as a candidate result; and
determining the routing result for which the resource allocation has been completed as a candidate result, and determining a route computation result of the route computation request according to the candidate result.

12. The route calculation apparatus for an OTN of claim 10, wherein defining the routing result for which the resource allocation has been completed as a candidate result, and determining a route computation result of the route computation request according to the candidate result comprises:
defining the routing result for which the resource allocation is completed earliest as the candidate result;
stopping invocation of the KSP algorithm, and stopping resource allocation processes of the routing results for which the resource allocation has not been completed; and
defining the candidate result as the route computation result of the route computation request.

13. The route calculation apparatus for an OTN of claim 10, wherein a plurality of candidate results are determined, and determining a route computation result of the route computation request according to the candidate results comprises:
in response to priority of any one of the candidate results being greater than priority of the routing result for which the resource allocation has not been completed yet, defining the routing result with the highest priority among the candidate results as the route computation result of the route computation request.

14. The route calculation apparatus for an OTN of claim 10, wherein during allocating a resource allocation thread for each of the routing results, the instructions cause the at least one processor to perform the following step:
in response to a number of the routing results being greater than a number of the resource allocation threads, saving the routing results for which the resource allocation has not been performed to a cache pool.

15. The non-transitory computer-readable storage medium of claim 11, wherein defining the routing result for which the resource allocation has been completed as a candidate result, and determining a route computation result of the route computation request according to the candidate result comprises:
defining the routing result for which the resource allocation is completed earliest as the candidate result;
stopping invocation of the KSP algorithm, and stopping resource allocation processes of the routing results for which the resource allocation has not been completed; and
defining the candidate result as the route computation result of the route computation request.

16. The non-transitory computer-readable storage medium of claim 11, wherein a plurality of candidate results are determined, and determining a route computation result of the route computation request according to the candidate results comprises:
in response to priority of any one of the candidate results being greater than priority of the routing result for which the resource allocation has not been completed yet, defining the routing result with the highest priority among the candidate results as the route computation result of the route computation request.

17. The non-transitory computer-readable storage medium of claim 11, wherein during allocating a resource allocation thread for each of the routing results, the instructions cause the at least one processor to perform the following step:
  in response to a number of the routing results being greater than a number of the resource allocation threads, saving the routing results for which the resource allocation has not been performed to a cache pool.

18. The route calculation apparatus for an OTN of claim 14, further comprising:
  in response to a presence of an idle resource allocation thread, allocating the routing result with the highest priority in the cache pool to the idle resource allocation thread.

19. The route computation method for an OTN of claim 14, further comprising:
  in response to the resource allocation having been completed for any one of the routing results, clearing all the routing results in the cache pool.

20. The non-transitory computer-readable storage medium of claim 17, further comprising:
  in response to a presence of an idle resource allocation thread, allocating the routing result with the highest priority in the cache pool to the idle resource allocation thread.

* * * * *